United States Patent
Wolfe et al.

(10) Patent No.: US 8,862,584 B2
(45) Date of Patent: Oct. 14, 2014

(54) METHOD FOR PRIVATELY FILTERING AND PARTITIONING A SET OF PHOTOGRAPHS OF A SOCIAL MEDIA SITE USER

(75) Inventors: Gregory Wolfe, Royersford, PA (US); Margo Goodman, Allentown, PA (US)

(73) Assignee: Pic Me First, LLC, Royersford, PA (US)

( * ) Notice: Subject to any disclaimer, the term of this patent is extended or adjusted under 35 U.S.C. 154(b) by 285 days.

(21) Appl. No.: 13/535,640

(22) Filed: Jun. 28, 2012

(65) Prior Publication Data
US 2014/0006395 A1    Jan. 2, 2014

(51) Int. Cl.
*G06F 17/30* (2006.01)

(52) U.S. Cl.
USPC ........... 707/737; 707/748; 707/751; 707/915; 705/319

(58) Field of Classification Search
CPC .................... G06F 17/30256; G06F 17/30268
See application file for complete search history.

(56) References Cited

U.S. PATENT DOCUMENTS

| | | | |
|---|---|---|---|
| 6,388,732 B1 | 5/2002 | Williams | |
| 6,438,579 B1 | 8/2002 | Hosken | |
| 7,778,486 B2 | 8/2010 | Fitzpatrick | |
| 7,849,116 B2 | 12/2010 | Jacobs et al. | |
| 8,010,459 B2 | 8/2011 | Buyukkokten et al. | |
| 2003/0187664 A1 | 10/2003 | Bonebrake | |
| 2004/0249811 A1 | 12/2004 | Shostack et al. | |
| 2005/0063613 A1 | 3/2005 | Casey | |
| 2005/0144633 A1* | 6/2005 | Babayan | 725/24 |
| 2006/0003302 A1* | 1/2006 | Fisher | 434/306 |
| 2007/0129966 A1 | 6/2007 | Walker | |
| 2007/0186230 A1* | 8/2007 | Foroutan | 725/24 |
| 2007/0208575 A1 | 9/2007 | Habichler | |
| 2007/0244749 A1* | 10/2007 | Speiser et al. | 705/14 |
| 2008/0070206 A1 | 3/2008 | Perilli | |
| 2008/0172291 A1 | 7/2008 | Hurowitz | |
| 2008/0228580 A1 | 9/2008 | Korman et al. | |
| 2009/0083653 A1 | 3/2009 | Makoff | |
| 2009/0094039 A1 | 4/2009 | MacDonald | |
| 2009/0094048 A1 | 4/2009 | Wallace | |
| 2009/0210246 A1 | 8/2009 | Patel | |
| 2010/0119053 A1 | 5/2010 | Goeldi | |
| 2010/0123796 A1 | 5/2010 | Sorensen | |
| 2010/0211514 A1 | 8/2010 | Sundaresan et al. | |
| 2010/0262550 A1 | 10/2010 | Burritt | |
| 2010/0268661 A1 | 10/2010 | Levy | |
| 2010/0306004 A1 | 12/2010 | Burtner | |
| 2011/0075917 A1 | 3/2011 | Cerosaletti et al. | |
| 2011/0178940 A1 | 7/2011 | Kelley | |
| 2011/0208665 A1 | 8/2011 | Hirsch | |
| 2011/0270774 A1 | 11/2011 | Varshavsky | |
| 2011/0276507 A1 | 11/2011 | O'Malley | |
| 2011/0317870 A1 | 12/2011 | Blose et al. | |
| 2012/0196268 A1* | 8/2012 | Cacciolo, Jr. | 434/362 |

* cited by examiner

*Primary Examiner* — Anh Tai Tran
(74) *Attorney, Agent, or Firm* — Riddle Patent Law, LLC; Charles L. Riddle

(57) ABSTRACT

A method for enabling a user to submit proposed photos of the user, remotely, and in confidence, to a peer user to have the peer user review and rank each of the photos in order of preference, and to receive the results of the review and ranking made by the peer user. The peer user feedback may be then considered in assisting the user in determining which photos the user should upload to a given social media website to portray the user.

18 Claims, 2 Drawing Sheets

METHOD FOR PRIVATELY FILTERING AND PARTITIONING A SET OF PHOTOGRAPHS OF A SOCIAL MEDIA SITE USER

CROSS REFERENCE TO RELATED APPLICATIONS

Not Applicable.

STATEMENT AS TO FEDERALLY SPONSORED RESEARCH

Not applicable.

BACKGROUND OF INVENTION a. Field of Invention

The invention relates generally to the field of social media. More particularly, the invention refers to enabling remote, private, and anonymous peer review in order to filter (partition) a set of photographs of a social media website user, with the intended use of later displaying one or more of such filtered photographs to favorably portray the user on a given social media website. The invention also relates generally to the field of computerized and internet-based methods and systems for enabling remote, private, and anonymous editing/enhancement of photographs of a user by another, with the intended use of displaying one or more of such edited/enhanced photographs to favorably portray the user on a given social media website. The invention also relates generally to the field of monetarily incentivizing participation of others to provide the peer review and/or editing for the social media website user.

b. Background of Invention

With the proliferation of the internet, a growing number of social media websites are emerging, the total of which are used by millions of users. In many cases, to gain access and use of the benefits and services of a given social media website, a user is either encouraged or required to publish photographs of themselves, onto these websites, in generally open forums, to be seen and viewed by large numbers of people. Exemplary categories of such social media sites include professional networking sites such as LinkedIn and Monster.com; dating websites such as Match.com and eHarmony; and social websites such as Facebook and Google+. Other examples include an individual user's website, or a corporate website, or any other internet site where photos are openly displayed. Users too often, naively post one or more photographs of themselves that are either not suitable for or are inappropriately selected for use with the particular social media site. Ideally, a user seeks to publish only those photographs of themselves which portray themselves favorably for the intended use of the given social media website.

A user may seek feedback on the suitability or appropriateness of each photograph in a set of photographs from personal acquaintances and family members. However, the user may not receive a candid response due to the reviewer's inclination to avoid providing negative feedback or insulting the user. In some instances, with proposed photos for a job-seeking social media site, for example, family members and/or personal acquaintances may not have a frame of reference or know the appropriate standards that a potential employer would have and, thus, are unable to provide the necessary feedback to the user to allow the user to determine which of the proposed photos, are best suited to publish on the job-seeking website. Therefore, this personal/family feedback is often inadequate. In the dating category, a user may be dissuaded from seeking feedback from an acquaintance or family member for various privacy reasons. Accordingly, there is a need to provide social website users with accurate, private, anonymous, and candid feedback, on each individual photo in a set of proposed photos, to assist the user in partitioning their photos into two groups (those best suited to upload to a social media site and those which should not be uploaded to a social media site).

Presently, there is no medium available that provides a social website user with a private ranking or critique of each of the user's proposed photographs based on the user's intended use (dating, job seeking, professional networking, social networking) before any of the photographs are publically uploaded.

U.S. Pat. No. 8,010,459 discloses systems and methods for users to rate members in a social network, as to the category (or type) of person the user feels a given member might fall into (as a person). In '459, one element of rating a member (as a person type), may include a review of the photos of the member (as a photo set), however, there is no provision for rating an individual photo of a member versus other photos of the same member and thus, there is no means to filter or partition the member's photos. Also, the '459 patent, and the references discussed therein are public in that the ratings take place after the photographs are all published to the intended website. None of the references discussed, disclose assisting a member, in private, in confidence, or otherwise, in selecting those photos which are best suited to upload to the social website (and which should not be uploaded to the social site). Moreover, the '459 patent are self-directed ratings, in that the ratings are only available to the user who made the ratings and not the member who uploaded the photographs. Thus, '459 fails to disclose a system or method for privately filtering and partitioning a set of photographs of a website user.

There is known in the art, www.hotornot.com, which is an online dating service that attempts to match members together. Each member uploads a picture of themselves along with unique information describing their personality. Then, through an open forum voting process, which includes votes from a community of members, in a number of personality areas, a unique numerical personality attractiveness rating is determined for each member. The service then facilitates each member's ability to search the database in order to find close personality matches to themselves. A close match is thought to be any two members who have the same, or similar personality attractiveness scores. This reference fails to disclose any system or method to, privately and confidentially, assist a user in selecting which photo or photos, of a given set of photos, are best suited for uploading to a given social media website.

U.S. Pat. No. 7,849,116 discloses systems and methods for allowing users to upload many types of images (people, landscapes, pets, objects, etc.) that are intended to represent or portray, through imagery, a given situation. In this system, there is no association between a user and an image. Such images are uploaded and made available to a community of users, in an open forum, whereby all members of the community of users are each able to vote on each image, as to how strongly they feel the attributes of a given image portrays or represents a given situation. Such votes are then tallied, for each situational category, and the image is then stored into a folder name which best describes the highest situation vote for that particular image. In so doing, such photos are easily later retrieved when a user seeks to locate an image which describes a certain situation of interest to the user. This reference fails to disclose any system or method to, privately and/or confidentially, assist a user in selecting which photo or photos (of themselves), of a given set of photos (of themselves), are best suited for uploading to a given social media website.

SUMMARY OF INVENTION

Photo Review and Ranking:

The present invention provides a method and system for enabling remote, anonymous, confidential, peer review of photographs of a social media website user, with the intended purpose of using filtered/ranked photographs to favorably portray the user on a social media website. In an embodiment of the present invention method, a software application receives user information from a user and a set of photographs portraying the user. The application enables a peer user to anonymously and privately view and preferentially rank and/or order the set of photographs of the user from most preferential to least preferential. The user is then anonymously and privately provided with a ranking of the photographs of the user.

In an embodiment of the present method, the step of enabling a peer user further includes:
  (a) creating a user attribute set UAS by:
    (i) receiving a desired use indicator (dating, social friends, professional colleagues, jobseeker), from the user, that identifies the desired social media use associated with the photographs of the user, and/or
    (ii) identifying a set of targeted audience attributes TAAS based on the user information and the desired use indicator from the user,
  (b) creating a plurality of peer user attribute sets PUAS for each of a plurality of peer users by receiving peer user information (age, sex, sexual preference, education level, occupation, location, number of children, etc.) from each of a plurality of peer users, and
  (c) identifying one or more PUAS that are a suitable match for photo evaluation by calculating a match score for each of the plurality of PUAS, and, if the match score for a given PUAS meets a predetermined range, the peer user associated with the given PUAS is given access to view and preferentially rank and order the set of photographs of the user.

In an embodiment of the present method, the step of calculating a match score comprises comparing each of the one or more attributes of the UAS with each of the one or more corresponding attributes of a PUAS to obtain a level of agreeance among the attributes.

In an embodiment of the present method, the comparing step includes comparing the attributes, each comparison made according to one or more predetermined attribute matching tolerance criteria.

In an embodiment of the present method, the step of enabling a peer user further includes:
  (a) receiving a desired use indicator (dating, social friends, professional colleagues, jobseeker), from the user, that identifies the desired social media use associated with the photographs of the user,
  (b) identifying a set of targeted audience attributes (TAAS) based on the user information and the desired use indicator from the user,
  (c) receiving peer user information (age, sex, sexual preference, education level, occupation, location, number of children, etc.) from each of a plurality of peer users, and
  (d) providing at least one given peer user (of the plurality of peer users) access to view and preferentially rank and order the set of photographs of the user when at least one or more of the targeted audience attributes of the TAAS are determined to match an aspect of the peer user information of the given peer user.

In an embodiment of the present method, the step of enabling a peer user further includes:
  (a) receiving a desired use indicator (dating, social friends, professional colleagues, jobseeker), from the user, that identifies the desired social media use associated with the photographs of the user,
  (b) identifying a set of targeted audience attributes (TAAS) based on the user information and the desired use indicator from the user,
  (c) receiving peer user information (age, sex, sexual preference, education level, occupation, location, number of children, etc.) from each of a plurality of peer users, and
  (d) providing at least one given peer user (of the plurality of peer users) access to view and preferentially rank and order the set of photographs of the user when the peer user information of the given peer user matches the TAAS.

In an embodiment of the present method, the step of preferentially ranking the photographs of the user includes basing such ranking on a set of predetermined criteria.

In an embodiment of the present invention, the method further includes the steps of enabling a peer user, to (anonymously and privately) comparatively critique the photographs of the user, and providing the user (anonymously and privately), with a comparative critique by the peer user, of the photographs of the user.

In an embodiment of the present invention, the step of comparatively critiquing the photographs of the user is based on criteria which is equivalent to a criteria used in the preferential ranking, by the peer user, of the photographs of the user. Alternately, the step of comparatively critiquing the photographs of the user includes basing such comparative critiquing on a set of predetermined criteria.

In an embodiment of the present invention, the method includes the step of allowing the user to select one or more photographs of the user for deletion, and/or allowing the user to select one or more photographs for sharing directly from a remote file server to a social media website.

In an embodiment of the present invention, the method includes one or more users also being peer users.

In an embodiment of the present invention, the internet based application includes one or more mobile based applications, the user or peer user may be users of one or more a social media mobile based application, and/or the sharing of one or more photographs may be with a mobile based application.

Critique & Feedback Communication Sessions:

In an embodiment of the present invention, the method includes the steps of enabling the user to request an anonymous and private chat communication session with a peer user and providing the means for the user and peer user to (anonymously and privately) conduct such a chat communication session, and wherein the steps of providing a means for the user and peer user to conduct a chat communication session may include either written or verbal forms of chat communication.

Photo Editing/Photo Enhancement:

In an embodiment of the present invention, the method includes the steps of providing (anonymously and privately) one or more photographs of the user to a peer user for editing/enhancing the photographs of the user, and (anonymously and privately) providing the user access to one or more edited photographs of the user.

Incentivizing Users to Participate as Peer Users:

In an embodiment of the present invention, the method includes the steps of attracting individuals and/or users to participate as peer users by remunerating peer users for an accounted number of photo ranking, photo critiquing, photo chatting, and/or photo enhancement actions performed in a given time period.

In an embodiment of the present invention, the remunerating step method further includes:

a. monitoring and counting of each photo ranking (a1) for each peer user, photo critiquing (a2) for each peer user, photo enhancement (a3) for each peer user, and photo chatting (a4) for each peer user through software administering the remote photo ranking, photo critiquing, photo enhancement, and photo chatting actions;

b. identifying the total number of photo ranking actions (A1) for all peer users by summing all the photo ranking actions (a1) of each individual peer user, and identifying the total number of photo critique actions (A2) for all peer users by summing all the photo critique actions (a2) of each individual peer user, and identifying the total number of photo enhancement actions (A3) for all peer users by summing all the photo enhancement actions (a3) of each individual peer user, and identifying the total number of photo chat actions (A4) for all peer users by summing all the photo chat actions (a4) of each individual peer user;

c. monitoring and counting of each photo request of said photo ranking (r1) for each user, photo critiquing (r2) for each user, photo enhancing (r3) for each user, and photo chatting (r4) for each user through software administering the remote photo ranking, photo critiquing, photo enhancement, and photo chatting requests made during the same time period as the photo actions counted in step a;

d. identifying the total number of photo ranking requests (R1) for all users by summing all the photo ranking requests (r1) of each individual user, and identifying the total number of photo critique requests (R2) for all users by summing all the photo critique requests (r2) of each individual user, and identifying the total number of photo enhancement requests (R3) for all users by summing all the photo enhancement requests (r3) of each individual user, and identifying the total number of photo chat requests (R4) for all users by summing all the photo chat requests (r4) of each individual user;

e. assigning compensation credit weighting for photo ranking (c1), and photo critiquing (c2), and photo enhancing (c3), and photo chatting (c4), whereby the sum of c1 and c2 and c3 and c4 is equal to 1; and f. determining the completion percentage for photo ranking (P1) by dividing A1 by R1 and the percent complete factor for photo critiquing (P2) by dividing A2 by R2 and the percent complete factor for photo enhancing (P3) by dividing A3 by R3 and the percent complete factor for photo chatting (P4) by dividing A4 by R4; and g. Identifying a total user fee amount (T) collected for all photo ranking, critiquing, enhancing, and chatting requests made by all users during that same time period in which the photo actions of step (b) are identified;

h. determining a weighted fee amount for photo ranking (F1) by multiplying c1 by T and a weighted fee amount for photo critiquing (F2) by multiplying c2 by T and a weighted fee amount for photo enhancing (F3) by multiplying c3 by T a weighted fee amount for photo chatting (F4) by multiplying c4 by T;

i. determining an earned pay amount, for all peer users, for photo ranking (E1) by multiplying P1 by F1 and an earned pay amount, for all peer users, for photo critiquing (E2) by multiplying P2 by F2 and an earned pay amount, for all peer users, for photo enhancing (E3) by multiplying P3 by F3 and an earned pay amount, for all peer users, for photo chatting (E4) by multiplying P4 by F4;

j. determining an earned pay amount, for an individual peer user, for photo ranking (e1) by dividing a1 by A1 and multiplying the result by E1 and an earned pay amount, for an individual peer user, for photo critiquing (e2) by dividing a2 by A2 and multiplying the result by E2 and an earned pay amount, for an individual peer user, for photo enhancing (e3) by dividing a3 by A3 and multiplying the result by E3 and an earned pay amount, for an individual peer user, for photo chatting (e4) by dividing a4 by A4 and multiplying the result by E4;

k. calculating an adjusted earned pay amount, for an individual peer user, for photo ranking (s1) by multiplying e1 by j1 and then subtracting k1, and an adjusted earned pay amount, for an individual user, for photo critiquing (s2) by multiplying e2 by j2 and then subtracting k2, and an adjusted earned pay amount, for an individual user, for photo enhancing (s3) by multiplying a3 by j3 and then subtracting k3, and an adjusted earned pay amount, for an individual user, for photo chatting (s4) by multiplying e4 by j4 and then subtracting k4, wherein j1, j2, j3, and j4 are percent bonus or percent deduction amounts and k1, k2, k3, and k4 are fixed bonus or fixed deduction amounts, l. calculating earned peer user pay (S) for a given peer user by summing s1 and s2 and s3 and s4; and m. paying the given peer user the calculating earned peer user pay (S).

Additional features, advantages, and embodiments of the invention may be set forth or apparent from consideration of the following detailed description. Moreover, it is to be understood that both the foregoing summary of the invention and the following detailed description are exemplary and intended to provide further explanation without limiting the scope of the invention.

BRIEF DESCRIPTION OF THE DRAWINGS

The accompanying drawings, which are included to provide a further understanding of the invention and are incorporated in and constitute a part of this specification, illustrate preferred embodiments of the invention and together with the detailed description serve to explain the principles of the invention. In the drawings.

DETAILED DESCRIPTION OF THE EMBODIMENTS

Embodiments of the present invention provide methods and systems for enabling a user to submit proposed photos of the user, remotely, anonymously, and in confidence, to a peer user to have the peer user review and rank each of the photos in order of preference, and to receive the results of the review and ranking made by the peer user. The peer user feedback may be then considered in assisting the user in determining which photos the user should upload to a given social media website to portray the user.

Figure 1:
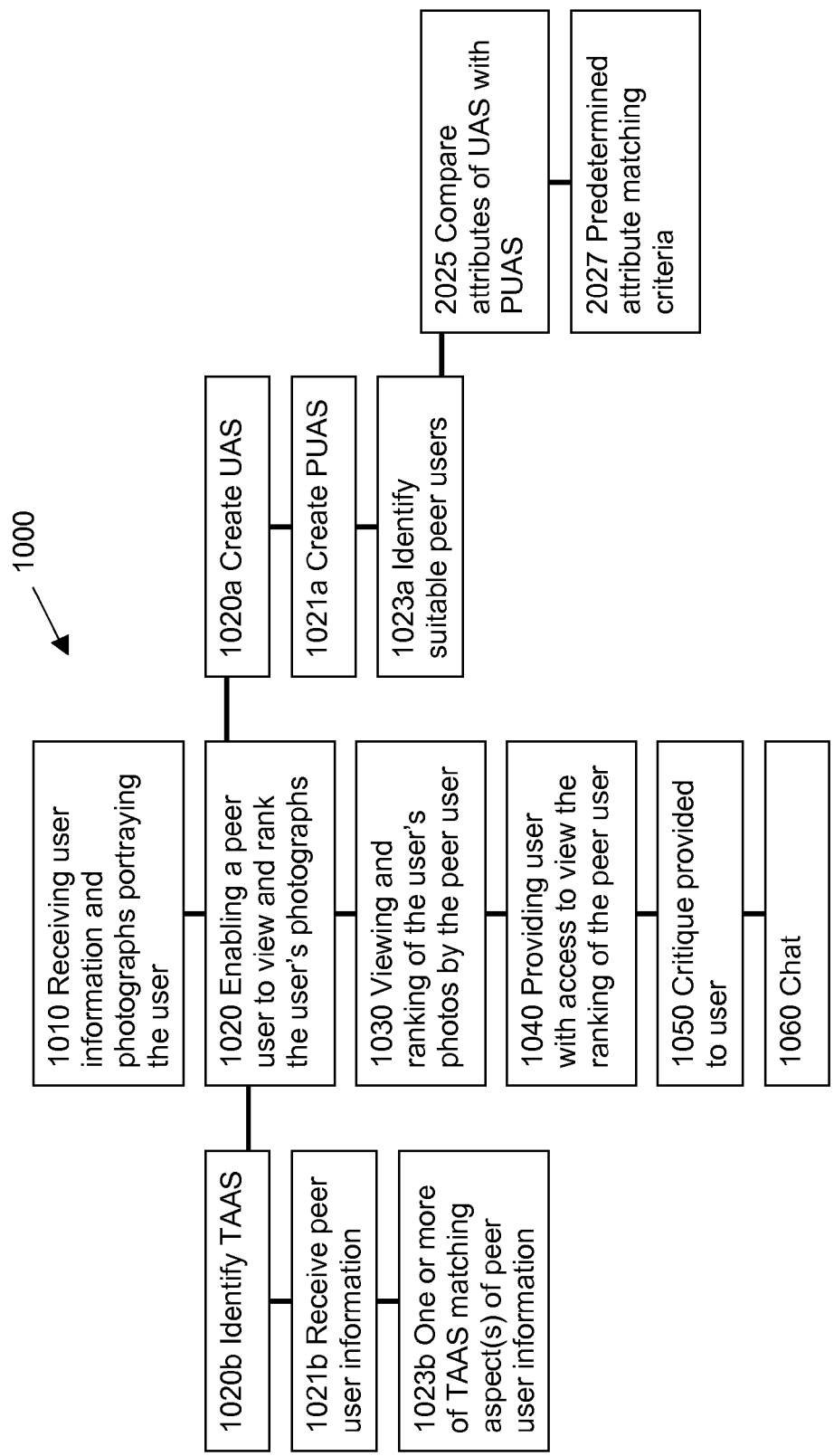
FIG. 1 is a schematic representation of an embodiment of the method.

Various methods in accordance with embodiments of the present invention may be accomplished. Referring to FIG. 1, one exemplary method 1000 according to the present invention comprises receiving user information from a user and a set of photographs portraying the user 1010. User information, by example, may include identification information such as name, email address, and other contact information. User information may also include login name, password, age, sex, sexual preference, education information, occupation, location, number of children, and an indication of the desired use of the photos (such as for attracting dates on a dating site, gaining favorable attention of prospective employers on a professional networking site, or impressing friends on a friends-networking site).

The photographs submitted by the user, typically are those photographs that portray the user, that the user is considering submitting to a social media website, but desires to obtain candid and anonymous feedback, in confidence from a peer user. As discussed herein, a social media site may include, professional networking websites, job-seeking websites, corporate websites, personal websites, dating websites, and social networking websites. In general, social media website may include any site where a user is considering posting pictures portraying himself or herself. As discussed herein, a social media website user is understood to be an individual or individuals who currently use or intend to use a social media website.

A peer user is enabled to view and preferentially rank and/or order the set of photographs of the user, with respect to the level of attraction, favorably gaining the attention of, or impressing the peer user, from most preferential to least preferential 1020 The user is then provided with a ranking (in preferential order) of the photographs 1040 of the user to assist the user in deciding which photos of the set best portray the user and/or which photos the user will post to a social media website. In an embodiment of the present method, receiving the peer user's ranking results may include accessing a webpage or mobile application page or the like that displays the user's photos in a logical flow from most preferential to least preferential. Similarly, in an embodiment of the present invention, the ranking results may be in numeric form and associated with each photo of the set submitted for review.

Anonymous viewing is understood to mean, in some embodiments, that the peer user does not necessarily know the identity of the user whose photos are being viewed/ranked/ordered/reviewed by the peer user. Anonymous may also include, in some embodiments, the user not necessarily knowing the identity of the peer user who is viewing and ranking the photos of the user. Stated another way, in some embodiments, user and peer user identification information, other than a user name in some instances or a coded identity, is not necessarily provided to either the user or peer user with the photos. In some embodiments of the method, identification information may become associated with the user/peer user, and each other known by each. However, in other embodiments, a user may prefer to obtain the review/ranking by the peer user without any exchange of identification information—other than a coded username, or a username.

Confidentiality—In a preferred embodiment of the present method the viewing, ranking, and receipt of the photos of the user, and the exchange of information between the user and peer user, is in confidence. That is, the information exchanged is private, no one else sees the information exchanged among the user and peer user, other than internal quality control personnel, or system maintenance/administration personnel.

In an embodiment of the present invention, the step of enabling a peer user 1020 further includes: (a) creating a user attribute set UAS 1020a by: (i) receiving a desired use indicator (dating, social friends, professional colleagues, job-seeker), from the user, that identifies the desired social media use associated with the photographs of the user, and/or (ii) identifying a set of targeted audience attributes TAAS based on the user information and the desired use indicator from the user.

The UAS may include information from a desired use indicator provided by the user, from a set of targeted audience attributes TAAS based on user information and the desired use indicator, or both. The desired use indicator, by example, may include information regarding the user's intended use of the photographs at issue. Such information may include whether the photos are to be used for online dating, social networking, friend-seeking, seeking professional colleagues, jobseeking, portraying the user to prospective clients, for a family blog, a company website, etc. TAAS, by example, may include user information as discussed herein, and/or desired use indicator information as discussed herein.

A plurality of peer user attribute sets PUAS are created 1021a for each of a plurality of peer users by receiving peer user information (age, sex, sexual preference, education level, occupation, location, number of children, etc.) from each of a plurality of peer users. Peer user information, by example includes information suited to determine whether the peer user is situated to be among target audience for a given user, and therefore in an optimal position to provide meaningful feedback when viewing photos of a give user. Such peer user information, by example, may include age, sex, sexual preference, education level, occupation, location, number of children, etc. Certain aspects of peer user information will be more useful depending on the desired use of the given user. For example, if the desired use of the user is for dating the following attributes become more relevant for the appropriate peer: age, sex, sexual preference, number of children, divorced, widowed, religion, lifestyle preferences, etc. If the desired use for the given user is for job seeking or professional networking, then the following aspects or attributes of peer user information become more relevant: job status, age, years of experience, field of practice, employer, self employed, senior status, retired, does hiring, conducts interviews, etc. For social networking and friendship the following criteria are more relevant to appropriately matching the given user with a peer user: age, sex, sexual preference, religion, lifestyle preferences, etc.

Once peer user attributes are obtained, the method includes identifying one or more PUAS that are a suitable match for photo evaluation 1023a by calculating a match score for each of the plurality of PUAS, and, if the match score for a given PUAS meets a predetermined range, the peer user associated with the given PUAS is given access to view and preferentially rank and order the set of photographs of the user 1030. In an embodiment of the present invention, calculating a match score includes assigning a weighted point value to each attribute that is determined to be a match between a given user and a one or more peer users, and the peer users associated with the highest match score are among the peer users that are provided access to view and preferentially rank and order the set of photographs of the user 1030.

In an embodiment of the present method, the step of calculating a match score 1023a comprises comparing each of the one or more attributes of the UAS with each of the one or more corresponding attributes of a PUAS to obtain a level of agreeance among the attributes 2025. A level of agreeance is a predetermined value understood from known comparison to represent that the peer user possesses those attributes that the given user is targeting as the intended audience for viewing the photos of the user on a social media website.

In an embodiment of the present method, the comparing step 2025 includes comparing the attributes, each comparison made according to one or more predetermined attribute matching tolerance criteria 2027. Predetermined attribute matching tolerance criteria, is that level of tolerance that is predetermined to be acceptable deviance from a peer user having an exact attribute match. By example, if a user is dating and seeking women at age 30, predetermined attribute matching criteria may return a peer user, female anywhere between the range 25 and 33, to be a positive match for that attribute. Similarly, for professional or jobseeking, a given user seeking employment/professional networking in the field of accounting, predetermined attribute matching criteria may return a peer user who is in the field of banking, or a mortgage broker as a positive match for that attribute.

In an embodiment of the present method 1000, the step of enabling a peer user 1020 includes: identifying a set of targeted audience attributes (TAAS) 1020b based on the user information and the desired use indicator from the user, receiving peer user information from each of a plurality of peer users 1021b, and providing at least one given peer user (of the plurality of peer users) access to view and preferentially rank and order the set of photographs 1030 of the user when at least one or more of the targeted audience attributes of the TAAS are determined to match an aspect of the peer user information of the given peer user 1023b.

In an embodiment of the present method 1000, the step of enabling at least one given peer user (of the plurality of peer users) with access to view and preferentially rank and order the set of photographs of the user 1020 occurs when the peer user information of the given peer user matches the TAAS.

In an embodiment of the present method, the step of preferentially ranking the photographs of the user includes basing such ranking on a set of predetermined criteria. Examples of predetermined criteria for preferentially ranking the photographs of the user include: Confidence and happiness for dating photos, types of dress and setting for professional photos, and facial smile and situational activity for friend-networking photos. More specifically, by way of example, dating photos of a man may be ranked in order of the level of confidence portrayed, whereas, dating photos of a woman may be ranked in order of the level of happiness portrayed. Such predetermined ranking criteria may be a result of studies which may have shown that such attributes (confidence and happiness for example) may not be viewed with equal importance, for men versus women.

In an embodiment of the present invention, the method 1000 further includes the steps of enabling a peer user, to (anonymously and privately) comparatively critique the photographs of the user, and providing the user (anonymously and privately), with a comparative critique by the peer user, of the photographs of the user 1050. Critique is understood to be written or audio discussion of the subject matter of the photos. Examples include suggestions on lighting, dress, hair, make up, background, surroundings, facial expressions, etc.

In an embodiment of the present invention, the step of comparatively critiquing the photographs of the user is based on criteria which is equivalent to a criteria used in the preferential ranking, by the peer user, of the photographs of the user. Alternately, the step of comparatively critiquing the photographs of the user includes basing such comparative critiquing on a set of predetermined criteria.

In an embodiment of the present invention, the method 1000 includes the step of allowing the user to select one or more photographs of the user for deletion, and/or allowing the user to select one or more photographs for sharing directly from a remote file server to a social media website. etc.

In an embodiment of the present invention, the method 1000 includes one or more users also being peer users. In an embodiment of the present method 1000, the internet based application includes one or more mobile based applications, the user may be a user of a social media mobile based application, and/or the sharing of one or more photographs may be with a mobile based application.

Critique & Feedback Communication Sessions:

In an embodiment of the present invention, the method 1000 includes the steps of enabling the user to request an anonymous and private chat communication session 1060 with a peer user and providing the means for the user and peer user to (anonymously and privately) conduct such a chat communication session, and wherein the steps of providing a means for the user and peer user to conduct a chat communication session may include either written or verbal forms of chat communication.

Photo Editing/Photo Enhancement:

In an embodiment of the present invention, the method 1000 includes the steps of providing (anonymously and privately) one or more photographs of the user to a peer user for editing/enhancing the photographs of the user, and (anonymously and privately) providing the user access to one or more edited photographs of the user once the editing/enhancement is complete. Examples of such editing include, but are not limited to, sharpening of one or more photos, teeth whitening, cropping, contrast or lighting adjustment, changing a background or setting, removing or smoothing skin blemishes etc.

Incentivizing Users and Individuals to Participate as Peer Users:

In an embodiment of the present invention, the method 1000 includes the steps of attracting individuals and/or users to participate as peer users by remunerating peer users for an accounted number of photo ranking, photo critiquing, photo chatting, and/or photo enhancement actions performed in a given time period.

In an embodiment of the present method 1000, a peer user may be paid for each photo ranking, photo critiquing, photo chatting, and/or photo enhancement action performed in a given time period. In another embodiment of the present method 1000, said payment is based on a fraction of the total peer user actions performed, and weighted depending on the total amount of actions performed in of each category of photo ranking, photo critiquing, photo chatting, and/or photo enhancement actions performed in a given time period.

In an embodiment of the present invention, by example the remunerating step method further includes monitoring and counting of each photo ranking (a1) for each peer user, photo critiquing (a2) for each peer user, photo enhancement (a3) for each peer user, and photo chatting (a4) for each peer user through software administering the remote photo ranking, photo critiquing, photo enhancement, and photo chatting actions.

The total number of photo ranking actions (A1) for all peer users are identified by summing all the photo ranking actions (a1) of each individual peer user, and identifying the total number of photo critique actions (A2) for all peer users by summing all the photo critique actions (a2) of each individual peer user, and identifying the total number of photo enhancement actions (A3) for all peer users by summing all the photo enhancement actions (a3) of each individual peer user, and identifying the total number of photo chat actions (A4) for all peer users by summing all the photo chat actions (a4) of each individual peer user;

Each photo request of said photo ranking (r1) for each user, photo critiquing (r2) for each user, photo enhancing (r3) for each user, and photo chatting (r4) is monitored and counted for each user through software administering the remote photo ranking, photo critiquing, photo enhancement, and photo chatting requests made during the same time period as the photo actions counted above.

The total number of photo ranking requests (R1) for all users is identified by summing all the photo ranking requests (r1) of each individual user, and identifying the total number of photo critique requests (R2) for all users by summing all the photo critique requests (r2) of each individual user, and identifying the total number of photo enhancement requests (R3) for all users by summing all the photo enhancement requests (r3) of each individual user, and identifying the total number of photo chat requests (R4) for all users by summing all the photo chat requests (r4) of each individual user.

Compensation credit weighting is assigned for photo ranking (c1), and photo critiquing (c2), and photo enhancing (c3), and photo chatting (c4), whereby the sum of c1 and c2 and c3 and c4 is equal to 1.

The completion percentage for photo ranking (P1) is determined by dividing A1 by R1 and the percent complete factor for photo critiquing (P2) by dividing A2 by R2 and the percent complete factor for photo enhancing (P3) by dividing A3 by R3 and the percent complete factor for photo chatting (P4) by dividing A4 by R4.

A total user fee amount (T) collected for all photo ranking, critiquing, enhancing, and chatting requests made by all users during that same time period is identified.

A weighted fee amount for photo ranking (F1) is determined by multiplying c1 by T and a weighted fee amount for photo critiquing (F2) by multiplying c2 by T and a weighted fee amount for photo enhancing (F3) by multiplying c3 by T a weighted fee amount for photo chatting (F4) by multiplying c4 by T;

An earned pay amount is determined, for all peer users, for photo ranking (E1) by multiplying P1 by F1 and an earned pay amount, for all peer users, for photo critiquing (E2) by multiplying P2 by F2 and an earned pay amount, for all peer users, for photo enhancing (E3) by multiplying P3 by F3 and an earned pay amount, for all peer users, for photo chatting (E4) by multiplying P4 by F4.

An earned pay amount is determined, for an individual peer user, for photo ranking (e1) by dividing a1 by A1 and multiplying the result by E1 and an earned pay amount, for an individual peer user, for photo critiquing (e2) by dividing a2 by A2 and multiplying the result by E2 and an earned pay amount, for an individual peer user, for photo enhancing (e3) by dividing a3 by A3 and multiplying the result by E3 and an earned pay amount, for an individual peer user, for photo chatting (e4) by dividing a4 by A4 and multiplying the result by E4.

An adjusted earned pay amount is calculated, for an individual peer user, for photo ranking (s1) by multiplying e1 by j1 and then subtracting k1, and an adjusted earned pay amount, for an individual user, for photo critiquing (s2) by multiplying e2 by j2 and then subtracting k2, and an adjusted earned pay amount, for an individual user, for photo enhancing (s3) by multiplying a3 by j3 and then subtracting k3, and an adjusted earned pay amount, for an individual user, for photo chatting (s4) by multiplying e4 by j4 and then subtracting k4, wherein j1, j2, j3, and j4 are percent bonus or percent deduction amounts and k1, k2, k3, and k4 are fixed bonus or fixed deduction amounts.

Earned peer user pay (S) is calculated for a given peer user by summing s1 and s2 and s3 and s4. The given peer user is paid the calculating earned peer user pay (S).

The mathematical formula below exemplifies one embodiment of the remuneration method.

Equation for payment amount for $m^{th}$ payee:

$$S_m = \left( \sum_{q=1}^{y} \left( \frac{(a_q)_m * (c_q) * T}{\sum_{n=1}^{z} (r_q)_n} \right) * j_q + k_q \right)$$

Where:
S=Payment amount for given payee (in a given time period)
m=$m^{th}$ payee
y=total number of task types
q=$q^{th}$ task
a=total number of actions completed
c=assigned task weighting
T=Total fees collected from requesters in given time period
z=total number of requesters
n=$n^{th}$ requester
r=total number of requests made
j=percent bonus/deduction factor
k=fixed bonus/deduction amount System Architecture Various systems for facilitating the methods disclosed herein may be constructed. By example, FIG. 2 discloses a system in which various exemplary embodiments of the present invention method may operate. The system 10 shown in FIG. 2 comprises multiple client devices 12a-n in communication with a server device 14 over a network 16. The network 16 shown can comprise the Internet, an automated or electronic data network, a mobile network, or any other suitable network, or a combination of such networks. In other embodiments, other networks, wired and wireless, such as an intranet, local area network, wide area network, or broadcast network may be used. Moreover, methods according to the present invention may operate within a single client or server device. In the example shown, the method 1000 illustrated in FIG. 1 can be implemented by the system 10 of FIG. 2.

Figure 2:
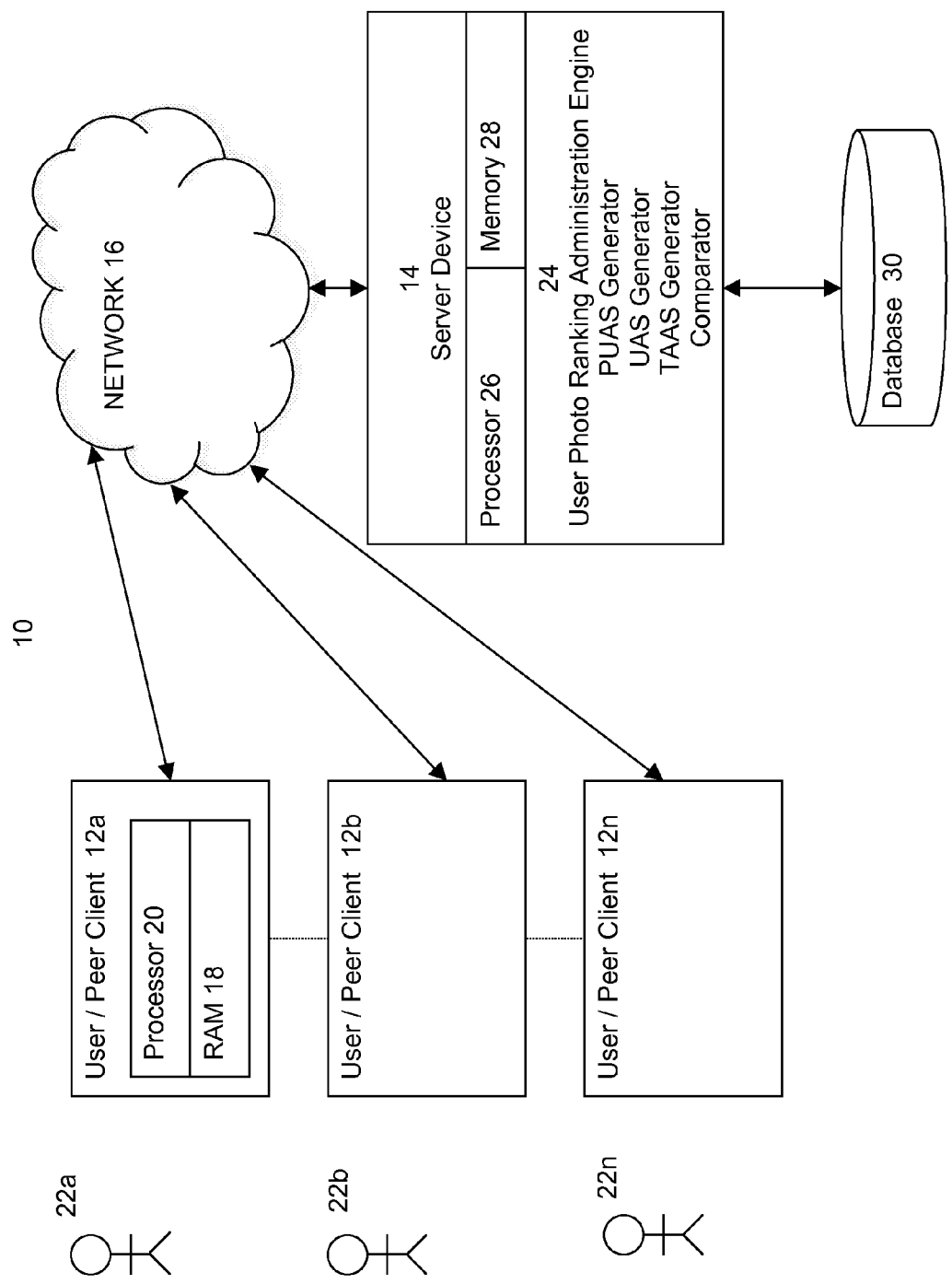
FIG. 2 is a schematic representation of an embodiment of a system for enabling the method.

Each client device 12a-n shown in FIG. 2 preferably comprises a computer-readable medium. The computer-readable medium shown can comprise a random access memory (RAM) 18 coupled to a processor 20. The processor 20 can execute computer-executable program instructions stored in the memory 18. Such processors may comprise a microprocessor, an Application-Specific Integrated Circuit (ASIC), a state machine, or other processor. Such processors comprise, or may be in communication with, media, for example computer-readable media, which stores instructions that, when executed by the processor, cause the processor to perform the steps described herein.

Embodiments of computer-readable media may comprise an electronic, optical, magnetic, or other storage or transmission device capable of providing a processor, such as the processor 20 of client 12a, with computer readable instructions. Other examples of suitable media may comprise a floppy disk, Compact Disk Read Only Memory (CD-ROM), magnetic disk, memory chip, Read Only Memory (ROM), Random Access Memory (RAM), an ASIC, a configured processor, all optical media, all magnetic tape or other magnetic media, or any other suitable medium from which a computer processor can read instructions or on which instructions, code, or other data may be stored. Also, various other forms of computer-readable media may transmit or carry instructions to a computer, including a router, private or public network, or other transmission device or channel, both wired and wireless. The instructions may comprise code from any suitable computer-programming language, including but not limited to, for example, C, C++, C#, Visual Basic, Java, Python, Perl, and JavaScript.

Client devices 12a-n may also comprise a number of external or internal devices such as a magnetic or smart card reader, biometric data collection devices mouse, a CD-ROM, a keyboard, a display, or other input or output devices. Examples of client devices 12a-n are personal computers, media center computers, televisions, television set-top boxes, digital assistants, personal digital assistants, cellular phones, mobile phones, smart phones, pagers, digital tablets, laptop computers, Internet appliances, and other processor-based devices. In general, a client device 12a-n may be any type of processor-based platform that may be connected to a network 16 and that interacts with one or more application programs. Client Devices 12a-n may operate on any operating system, such as Microsoft® Windows®, Macintosh, Unix, or Linux, capable of supporting one or more client application programs. For example, the client device 12a shown comprises a personal computer executing client application programs, also known as client applications. The client applications can be contained in memory 18 and can comprise, for example, an Internet browser application, a mobile application and any other application or computer program capable of being executed by a client device.

Each of the client devices 12a-n can be associated with a respective subscribing entity or subscriber, shown as users/peer users 22a-n. Through the client devices 12a-n, users 22a-n can communicate over the network 16 with each other and with other systems and devices coupled to the network 16. As shown in FIG. 2, a server device 14 is also coupled to the network 16. For example in the embodiment shown in FIG. 2, a user 22a can operate a respective client 22a to interact with the server device 14 and submit user information and user photographs. The client 12a can send a signal corresponding to the request via the network 16 to the server 14. Similarly, a peer user 22b can operate a respective client 12b to interact with the server device to receive a user's photos to view the user's photos and input rankings associated with each of said user's photos, wherein said rankings are submitted to the server device 14. The server device 14, in turn, submits the rankings of the user's photos to the respective client 22a to then be observed by the user 22a.

The server device 14 shown in FIG. 2 comprises a server executing at least one user photo ranking administration program, also known as the engine 24 or photo ranking administration engine 24 for performing the various steps of the method 1000. Similar to the client devices 12a-n, the server device 14 shown in FIG. 2 comprises a processor 26 coupled to a computer readable memory 28. Server device 14, depicted in FIG. 2 as a single computer system, may be implemented as a network of computer processors. Examples of a server device are servers, mainframe computers, networked computers, a processor-based device, and similar types of systems and devices. Client processors 20 and the server processor 26 can be any of a number of well known computer processors, such as processors from Intel Corporation of Santa Clara, Calif., and Motorola Corporation.

The receiving/transmission of photos step may occur between user client/peer user client, in that the server device does not receive the photos, but merely facilitates the transmission of the photos by granting/enabling access to the photos of a user by a peer user 1020.

Memory 28 on the server device 14 can contain the photo ranking administration engine 24. A photo ranking administration engine 24 can comprise a software or hardware application that is configured to automatically generate the PUAS, generate the UAS, generate the TAAS, calculate a PUAS match score for a given user versus the plurality of PUAS, handle attribute comparison among the UAS/TAAS of a given user and the PUAS, and control access to a given user's photographs, and any rankings thereto, as well as facilitate or enable or authorize communications between a given peer user and a given user, as well as account for monitoring and counting of each photo ranking (a1) for each peer user, photo critiquing (a2) for each peer user, photo enhancement (a3) for each peer user, and photo chatting (a4), as well as calculating remuneration.

The server device 14 can also communicate with at least one database 30, such as user/peer user database, to retrieve and/or store information associated with each user and peer user. The database 30 can comprise one or more storage devices with user/peer user information, or any other information which can be used to perform the functions described in the methods discussed herein.

Although the processes described herein are described in relation to the client and server or servers, a client may perform any or all of the processes described as being performed by a server. Similarly, a server or servers may perform any or all of the processes described herein as being performed by a client, although the invention is not limited to client/server architecture but can run on any desired topology or architecture as deemed fit for the purposes, whether existing as of the time of the writing of this document or thereafter.

Embodiments of the present invention can comprise systems having different architecture than that which is shown in FIG. 2. For example, in some systems according to the present invention, server device 14 may comprise a single physical or logical server. The system 10 shown in FIG. 2 is merely an example, and is used as an environment to help explain the example processes and methods shown in FIG. 1.

Although particular embodiments of the invention have been described in detail herein with reference to the accompanying drawings, it is to be understood that the invention is not limited to those particular embodiments, and that various changes and modifications, including the omission of steps or the interchangeability of the order of steps, may be effected therein by one skilled in the art without departing from the scope or spirit of the invention.

What is claimed:

1. A computer implemented method, through an internet based application, for filtering a set of photographs of a social media website user, by means of a privately based remote peer review, with filtered photographs to portray a user on a social media website, comprising:

receiving user information from the user, wherein the user information comprising a set of photographs of the user;

enabling peer users to view and preferentially rank the set of photographs of the user from most preferential to least preferential, and providing the user, with a ranking by the peer users, of the photographs of the user; and remunerating peer users for an accounted number of photo ranking, photo critiquing, photo chatting, or photo enhancement actions performed in a given time period on the photographs of the user, wherein the remunerating step includes:

a) monitoring and counting of each photo ranking (a1) for each peer user, photo critiquing (a2) for each peer user, photo enhancement (a3) for each peer user, and photo chatting (a4) for each peer user through software administering remote photo ranking actions, photo critiquing actions, photo enhancement actions, and photo chatting actions;

b) identifying a total number of photo ranking actions (A1) for all peer users by summing all the photo ranking actions of each individual peer user, and identifying a total number of photo critique actions (A2) for all peer users by summing all the photo critique actions of each individual peer user, and identifying a total number of photo enhancement actions (A3) for all peer users by summing all the photo enhancement actions of each individual peer user, and identifying a total number of photo chat actions (A4) for all peer users by summing all the photo chat actions of each individual peer user;

c) monitoring and counting of each photo request of photo ranking requests (r1) for each user, photo critiquing requests (r2) for each user, photo enhancing requests (r3) for each user, and photo chatting requests (r4) for each user through software administering a remote photo ranking requests, photo critiquing requests, photo enhancement requests, and photo chatting requests made during the given time period;

d) identifying a total number of photo ranking requests (R1) for all users by summing all the photo ranking requests of each individual user, and identifying a total number of photo critique requests (R2) for all users by summing all the photo critique requests of each individual user, and identifying a total number of photo enhancement requests (R3) for all users by summing all the photo enhancement requests of each individual user, and identifying a total number of photo chat requests (R4) for all users by summing all the photo chat requests of each individual user;

e) assigning compensation credit weighting to each of the photo ranking (c1), the photo critiquing (c2), the photo enhancing (c3), and the photo chatting (c4), whereby a sum of the compensation credit weighting is equal to one; and f) determining a completion percentage for the photo ranking by dividing A1 by R1 and the percent complete factor for photo critiquing (P2) by dividing A2 by R2 and the percent complete factor for photo enhancing (P3) by dividing A3 by R3 and the percent complete factor for photo chatting (P4) by dividing A4 by R4 ; and g) identifying a total user fee amount (T) collected for all photo ranking, photo critiquing, photo enhancing, and photo chatting requests made by all users during the given time period;

h) determining a weighted fee amount for photo ranking (F1) by multiplying c1 by T and a weighted fee amount for photo critiquing (F2) by multiplying c2 by T and a weighted fee amount for photo enhancing (F3) by multiplying c3 by T a weighted fee amount for photo chatting (F4) by multiplying c4 by T;

i) determining an earned pay amount, for all peer users, for photo ranking (E1) by multiplying P1 by F1 and an earned pay amount, for all peer users, for photo critiquing (E2) by multiplying P2 by F2 and an earned pay amount, for all peer users, for photo enhancing (E3) by multiplying P3 by F3 and an earned pay amount, for all peer users, for photo chatting (E4) by multiplying P4 by F4;

j) determining an earned pay amount, for an individual peer user, for photo ranking (e1) by dividing a1 by A1 and multiplying the result by E1 and an earned pay amount, for an individual peer user, for photo critiquing (e2) by dividing a2 by A2 and multiplying the result by E2 and an earned pay amount, for an individual peer user, for photo enhancing (e3) by dividing a3 by A3 and multiplying the result by E3 and an earned pay amount, for an individual peer user, for photo chatting (e4) by dividing a4 by A4 and multiplying the result by E4;

k) calculating an adjusted earned pay amount, for an individual peer user, for photo ranking (s1) by multiplying e1 by j1 and then subtracting k1, and an adjusted earned pay amount, for an individual user, for photo critiquing (s2) by multiplying e2 by j2 and then subtracting k2, and an adjusted earned pay amount, for an individual user, for photo enhancing (s3) by multiplying a3 by j3 and then subtracting k3, and an adjusted earned pay amount, for an individual user, for photo chatting (s4) by multiplying e4 by j4 and then subtracting k4, wherein j1, j2, j3, and j4 are percent bonus or percent deduction amounts and k1, k2, k3, and k4 are fixed bonus or fixed deduction amounts, l) calculating earned peer user pay (S) for a given peer user by summing s1 and s2 and s3 and s4; and m) paying the given peer user the calculating earned peer user pay (S).

2. The method of claim 1, wherein the step of enabling a peer user further includes: (a) receiving a use indicator associated with dating, or social friends, or professional colleagues, or jobseeker, from the user, that identifies the social media use associated with the photographs of the user, (b) identifying a set of targeted audience attributes (TAAS) based on the user information and the use indicator from the user, (c) receiving peer user information from each of a plurality of peer users, (d) providing at least one given peer user access to view and preferentially rank and order the set of photographs of the user when at least one or more of the targeted audience attributes of the TAAS are determined to match an aspect of the peer user information of the given peer user.

3. The method of claim 1, wherein the step of enabling a peer user further includes: (a) receiving a use indicator associated with dating, or social friends, or professional colleagues, or jobseeker, from the user, that identifies the social media use associated with the photographs of the user, (b) identifying a set of targeted audience attributes (TAAS) based on the user information and the use indicator from the user, (c) receiving peer user information from each of a plurality of peer users, (d) providing at least one given peer user access to view and preferentially rank and order the set of photographs of the user when the peer user information of the given peer user matches the TAAS.

4. The method of claim 1, wherein the step of preferentially ranking the photographs of the user includes ranking based on a set of predetermined criteria.

5. The method of claim 1, further including the steps of enabling the user to request an anonymous and private chat communication session with a peer user and providing means for the user and the peer user to conduct a chat communication session, and wherein the steps of providing a means for the user and peer user to conduct a chat communication session include either written or verbal forms of chat communication.

6. The method of claim 1, further including the steps of providing one or more photographs of the user to a peer user for editing or enhancing the photographs of the user, and providing the user access to one or more edited photographs of the user.

7. The method of claim 1, further including the steps of allowing the user to select one or more photographs of the user for deletion.

8. The method of claim 1, wherein one or more users are also peer users.

9. The method of claim 1, wherein the internet based application includes one or more mobile based applications.

10. The method of claim 1, wherein the user or peer user is a user of one or more social media mobile based applications.

11. The method of claim 1, wherein the step of enabling the peer users further includes: (a) creating a user attribute set (UAS) by: (i) receiving a use indicator associated with dating, or social friends, or professional colleagues, or jobseeker, from the user, that identifies the social media use associated with the photographs of the user, or (ii) identifying a set of targeted audience attributes (TAAS) based on the user information and the use indicator from the user, (b) creating a plurality of peer user attribute sets (PUAS) for each of the peer users by receiving peer user information from each of the peer users, and (c) identifying one or more PUAS that are a suitable match for photo evaluation by calculating a match score for each of the plurality of PUAS, and, if the match score for a given PUAS meets a predetermined range, the peer user associated with the given PUAS is given access to view and preferentially rank and order the set of photographs of the user.

12. The method of claim 11, wherein the step of calculating a match score comprises comparing each of the one or more attributes of the UAS with each of the one or more corresponding attributes of the PUAS to obtain a level of grievance among the attributes.

13. The method of claim 12, wherein the comparing step includes comparing the attributes, each comparison made according to one or more predetermined attributes matching tolerance criteria.

14. The method of claim 1, further including the steps of enabling a peer user, to comparatively critique the photographs of the user, and providing the user, with a comparative critique by the peer user.

15. The method of claim 14, wherein the step of comparatively critiquing the photographs of the user is based on criteria which is equivalent to a criteria used in the ranking, by the peer user, of the photographs of the user.

16. The method of claim 15, wherein the step of comparatively critiquing the photographs of the user includes comparative critiquing based on a set of predetermined criteria.

17. The method of claim 1, further including the steps of allowing the user to select one or more photographs for sharing directly from a remote file server to a social media website.

18. The method of claim 17, wherein the sharing of one or more photographs further comprising sharing the one or more photographs with a mobile based application.

\* \* \* \* \*